(12) United States Patent
Dholakia et al.

(10) Patent No.: US 8,122,485 B2
(45) Date of Patent: *Feb. 21, 2012

(54) AUTHENTICATION TECHNIQUES

(75) Inventors: Mehul Dholakia, Cupertino, CA (US);
Ron Talmor, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/896,645

(22) Filed: Oct. 1, 2010

(65) Prior Publication Data

US 2011/0107399 A1 May 5, 2011

Related U.S. Application Data

(63) Continuation of application No. 11/496,788, filed on Jul. 31, 2006, now Pat. No. 7,831,996.

(60) Provisional application No. 60/754,734, filed on Dec. 28, 2005.

(51) Int. Cl.
*H04L 9/32* (2006.01)
*H04L 9/00* (2006.01)

(52) U.S. Cl. ................................. 726/2; 726/3; 713/168

(58) Field of Classification Search .................. 726/2–4, 726/8–10, 20–21; 713/168, 170, 184, 186
See application file for complete search history.

(56) References Cited

U.S. PATENT DOCUMENTS

| | | | |
|---|---|---|---|
| 4,897,874 A | 1/1990 | Lidinsky et al. | |
| 5,237,614 A | 8/1993 | Weiss et al. | |
| 5,721,780 A | 2/1998 | Ensor et al. | |
| 5,757,924 A | 5/1998 | Friedman et al. | |
| 5,774,551 A | 6/1998 | Wu et al. | |
| 6,035,406 A | 3/2000 | Moussa et al. | |
| 6,167,052 A | 12/2000 | McNeill et al. | |
| 6,212,191 B1 | 4/2001 | Alexander et al. | |
| 6,339,830 B1 | 1/2002 | See et al. | |
| 6,874,090 B2 | 3/2005 | See et al. | |
| 7,062,566 B2 | 6/2006 | Amara et al. | |
| 7,502,929 B1 | 3/2009 | Schnizlein et al. | |
| 7,831,996 B2 | 11/2010 | Dholakia et al. | |
| 2002/0133534 A1 | 9/2002 | Forslow | |
| 2003/0056063 A1 | 3/2003 | Hochmuth et al. | |
| 2004/0030932 A1 | 2/2004 | Juels et al. | |
| 2004/0255154 A1 | 12/2004 | Kwan et al. | |
| 2005/0025125 A1 | 2/2005 | Kwan | |
| 2005/0055570 A1 | 3/2005 | Kwan et al. | |

OTHER PUBLICATIONS

Aboba, "IANA Consideration for RADIUS (Remote Authentication Dial in User Service)," Netwrok Working Group, RFC # 3575, Jul. 2003, printed on Mar. 13, 2007, at URL: http://tools.ietf.org/rfc/rfc3575.txt, pp. 1-8.

(Continued)

*Primary Examiner* — Hosuk Song
(74) *Attorney, Agent, or Firm* — Kilpatrick Townsend & Stockton LLP

(57) ABSTRACT

Techniques for authenticating clients of differing capabilities in an efficient manner. Two or more authentication techniques, including one preferred authentication technique, are initiated to run in parallel to authenticate a client. Upon determining that the client can support the preferred authentication technique, the preferred technique is used to authenticate the client and the other authentication techniques are aborted. If it is determined that the client cannot support the preferred authentication technique, then one of the other authentication techniques is used to authenticate the client. In this manner, based upon the capabilities of the client, an appropriate authentication technique is used to authenticate the client in an efficient manner.

22 Claims, 3 Drawing Sheets

OTHER PUBLICATIONS

Aboba et al., "Extensible Authentication Protocol (EAP)," Network Working Group, RFC # 3748, Jun. 2004, printed on Mar. 13, 2007, at URL: http://tools.ietf.org/rfc/rfc3748.txt, pp. 1-63.

Blunk et al., "PPP Extensible Authentication Protocol (EAP)," Network Working Group, RFC # 2284, Mar. 1998, printed on Mar. 13, 2007, at URL: http://tools.ietf.org/rfc/rfc2284.txt, pp. 1-15.

Congdon et al., "IEEE 802.1X Remote Authentication Dial in User Service (RADIUS) Usage Guidelines," Network Working Group, RFC # 3580, Sep. 2003, printed on Mar. 13, 2007, at URL: http://tools.ietf.org/rfc/rfc3580.txt on Mar. 13, 2007, pp. 1-29.

Foundry Security Guide, Jul. 2005, 200 pages, Foundry Networks, Inc.

Foundry Security Guide, Jan. 2006, 252 pages, Foundry Networks, Inc.

Foundry Fastlron X-Series and FastIron GS Configuration and Security Guide—FastIron Edge Switch x-Series, FastIron Workgroup Switch X-Series, FastIron SuperX Switch, FastIron SX Switch, FastIron GS Switch, Oct. 2006 (DRAFT), 1076 pages, Foundry Networks, Inc.

Rigney et al., "Remote Authentication Dial in User Service (RADIUS)," Network Working Group, RFC # 2058, Jan. 1997, printed on Mar. 13, 2007, at URL: http://tools.ietf.org/rfc/rfc2058.txt, pp. 1-60.

Rigney, C., "RADIUS Accounting," Network Working Group, RFC # 2059, Jan. 1997, printed on Mar. 13, 2007, at URL: http://tools.ietf.org/rfc/rfc2059.txt on Mar. 13, 2007, pp. 1-24.

Rigney et al., "Remote Authentication Dial in User Service (RADIUS)," Network Working Group, RFC # 2865, Jun. 2000, printed on Mar. 13, 2007, at URL: http://tools.ietf.org/rfc/rfc2865.txt, pp. 1-71.

Rigney, C., "RADIUS Accounting," Network Working Group, Request for Comments # 2866, Informational, Obsoletes # 2139, Jun. 2000, printed on Mar. 13, 2007, at URL: http://tools.ietf.org/rfc/rfc2866.txt, pp. 1-27.

Rigney, C., "RADIUS Accounting," Network Working Group, RFC # 2139, Apr. 1997, printed on Mar. 13, 2007, at URL: http://tools.ietf.org/rfc/rfc2139.txt, pp. 1-24.

Rigney et al., "Remote Authentication Dial In User Service (RADIUS)," Network Working Group, RFC # 2138, Apr. 1997, printed on Mar. 13, 2007, at URL: http://tools.ietf.org/rfc/rfc2138.txt, pp. 1-61.

Zorn et al., "RADIUS Accounting Modifications for Tunnel Protocol Support," network Working Group, RFC # 2867, Jun. 2000, printed on Mar. 13, 2007, at URL: http://tools.ietf.org/rfc/rfc2867.txt, pp. 1-11.

Zorn et al., "RADIUS Attributes for Tunnel Protocol Support," network Working Group, Request for Comments # 2868, Jun. 2000, printed on Mar. 13, 2007, at URL: http://tools.ietf.org/rfc/rfc2868.txt, pp. 1-19.

"IEEE Standard for Local and metropolitan area Networks—Port-Based Network Access Control," IEEE Std 802.1X-2001, copyright 2001, table of contents and pp. 1-134.

"802.1X™ IEEE Standard for Local and metropolitan area Networks—Port-Based Network Access Control," IEEE Std 802.1X™-2004, Dec. 13, 2004, table of contents and pp. 1-169.

Non-Final Office Action for U.S. Appl. No. 11/496,788, mailed on Aug. 12, 2009, 27 pages.

Non-Final Office Action for U.S. Appl. No. 11/496,788, mailed on Apr. 14, 2010, 6 pages.

Notice of Allowance for U.S. Appl. No. 11/496,788, mailed on Aug. 31, 2010, 8 pages.

AUTHENTICATION TECHNIQUES

CROSS-REFERENCES TO RELATED APPLICATIONS

The present application is a continuation of U.S. application Ser. No. 11/496,788, filed Jul. 31, 2006, entitled "Authentication Techniques," now U.S. Pat. No. 7,831,996, issued Nov. 9, 2010, which claims the benefit and priority under 35 U.S.C. 119(e) from U.S. Provisional Application No. 60/754,734 filed Dec. 28, 2005 titled "MAC-Based Authentication". The entire contents of the Ser. No. 11/496,788 and 60/754,734 applications are herein incorporated by reference for all purposes.

BACKGROUND

The present invention relates to authentication techniques and more particularly to using multiple authentication techniques to authenticate clients of differing capabilities.

An ever-increasing number of resources are now available via communication networks such as the Internet. Access servers and devices are generally used to control access to such resources. These access servers are configured to authenticate access requests received from clients and provide access to the resources only if authentication is successful. Various different authentication techniques may be used to perform the authentication. The type of authentication technique used is sometimes dependent upon the capability of the client requesting access.

For example, authentication techniques based upon the IEEE 802.1x standard (referred to as 802.1x based authentication) are commonly used to authenticate devices. These 802.1x based authentication techniques are however usable only if the client or device being authenticated can support 802.1x authentication, i.e., the client can interpret requests arising from the 802.1x authentication and respond to the requests appropriately. A client may support 802.1x authentication only if the client comprises an 802.1x client module that facilitates and supports 802.1x authentication and can respond to 802.1x authentication requests. However, there are several devices that do not have an embedded 802.1x client module that can support 802.1x authentication. For example, several IP phones do not have a 802.1x client installed on them. Other devices that may not provide support for 802.1x authentication include printers, and other networked devices. For such devices alternative authentication techniques have to be used.

Accordingly, the authentication technique that may be used to authenticate a client may depend upon the capabilities of the client. On several occasions, the access server does not have any information about the capabilities of a client. Consequently, techniques are desired that enable access servers to authenticate clients of differing capabilities in an efficient manner.

BRIEF SUMMARY

Embodiments of the present invention provide techniques for authenticating clients of differing capabilities in an efficient manner.

In one embodiment, two or more authentication techniques, including one preferred authentication technique, are initiated to run in parallel to authenticate a client. If it is determined that the client can support the preferred authentication technique then the preferred technique is used to authenticate the client and the other authentication techniques are aborted. If it is determined that the client cannot support the preferred authentication technique, then one of the other authentication techniques is used to authenticate the client.

In this manner, based upon the capabilities of the client, an appropriate authentication technique is used to authenticate the client in an efficient manner.

In one embodiment, 802.1x authentication is the preferred authentication technique and if this is not supported by the client then a MAC-based authentication technique is used to authenticate the client.

According to an embodiment of the present invention, techniques are provided for performing authentication. A first authentication technique and a second authentication technique are performed in parallel to authenticate a client. The client is authenticated using either the first authentication technique or the second authentication technique depending upon the client's ability to support the first authentication technique.

According to an embodiment of the present invention, techniques are provided for authenticating a client. A first authentication technique and a second authentication technique are initiated for authenticating a client. The first authentication technique and the second authentication technique are performed concurrently. It is determined, during performing the first authentication technique, if the client supports the first authentication technique. Performance of the first authentication technique is continued and the second authentication technique is aborted upon determining that the client supports the first authentication technique. The client is authenticated using the second authentication technique upon determining that the client does not support the first authentication technique.

According to an embodiment of the present invention, techniques are provided for performing authentication. A first authentication technique and a second authentication technique are initiated for authenticating a client such that the first authentication technique and the second authentication technique are performed concurrently. It is determined if the client supports the first authentication technique. The first authentication technique is used to authenticate the client upon determining that the client supports the first authentication technique. The second authentication technique is used to authenticate the client upon determining that the client does not support the first authentication technique.

In one embodiment, the client is denied or permitted to access a network based upon the first authentication technique if the client supports the first authentication technique and based upon the second authentication technique if the client does not support the first authentication technique.

In one embodiment, the second authentication technique uses an address associated with the client. The address associated with the client may be a medium access control (MAC) address of the client or an Internet Protocol (IP) address of the client or some other address. The first authentication technique may be based upon IEEE 802.1x.

According to an embodiment of the present invention, initiating the first authentication technique and the second authentication technique may comprise sending, as part of the first authentication technique, an information request to the client, and sending, as part of the second authentication technique, a first authentication request comprising an address of the client to an authentication server.

In one embodiment, it is determined if the client supports the first authentication technique by determining if a response is received from the client responsive to the information request, wherein receipt of a response indicates that the client supports the first authentication technique. A response may be received from the client responsive to the information request, and the first authentication technique may comprise sending a second authentication request to the authentication server, the authentication request comprising information received in the response, and receiving an authentication result from the authentication server indicative of authentication performed by the authentication server based upon the second authentication request. In one embodiment, the second authentication technique may be aborted upon determining that the client supports the first authentication technique.

In one embodiment, the second authentication technique comprises receiving an authentication result from the authentication server indicative of authentication performed by the authentication server based upon the first authentication request.

The foregoing, together with other features, embodiments, and advantages of the present invention, will become more apparent when referring to the following specification, claims, and accompanying drawings.

DETAILED DESCRIPTION

In the following description, for the purposes of explanation, specific details are set forth in order to provide a thorough understanding of the invention. However, it will be apparent that the invention may be practiced without these specific details.

Figure 1:
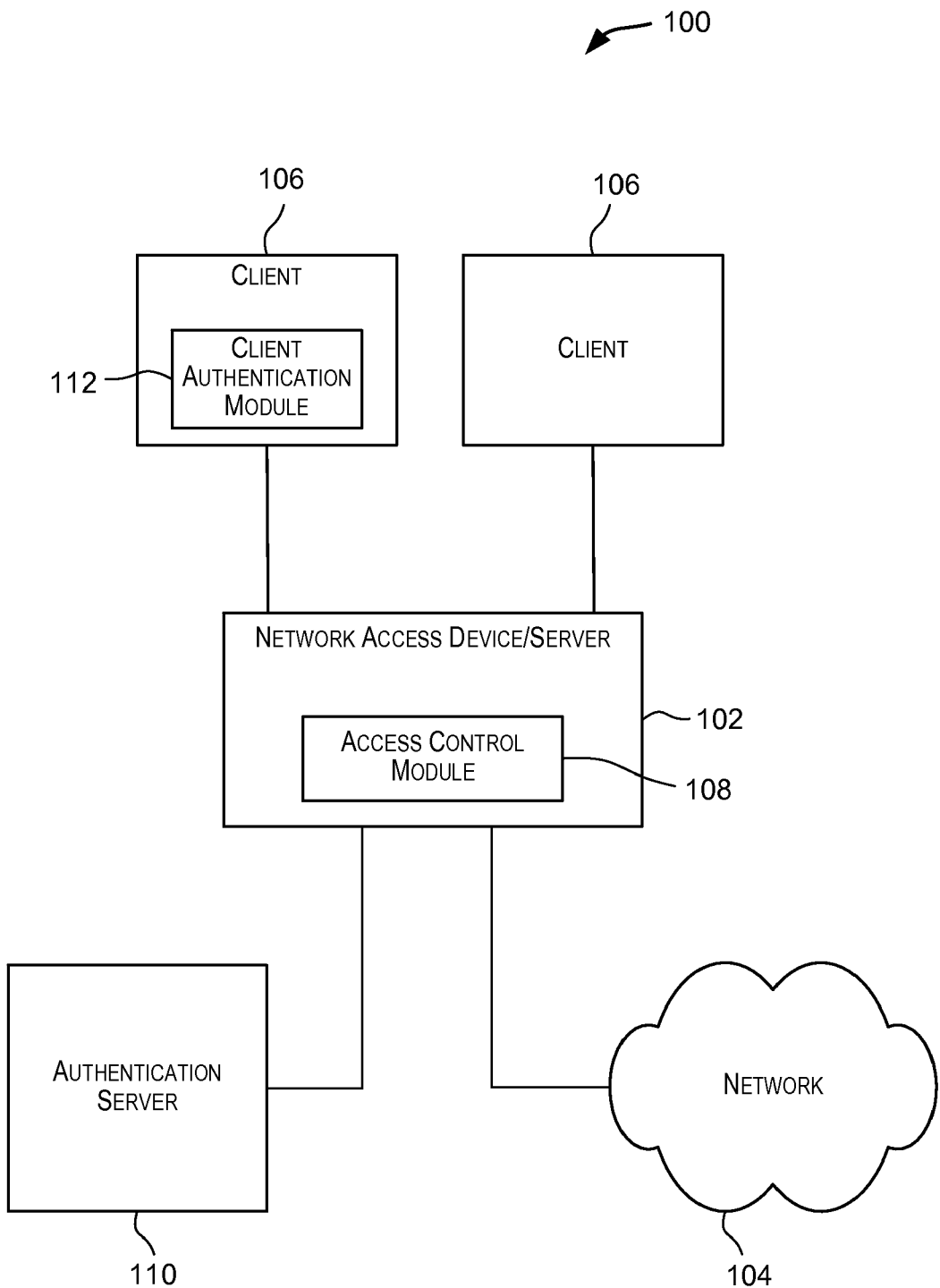
FIG. 1 is a simplified block diagram of a network system that may incorporate an embodiment of the present invention.

FIG. 1 is a simplified block diagram of a network system 100 that may incorporate an embodiment of the present invention. The various components depicted in FIG. 1 may be implemented in software (code or instructions executed by a processor), hardware, or combinations thereof.

As depicted in FIG. 1, network system 100 comprises a network access device or server 102 (referred to as "access server 102") coupled to a network 104. Access server 102 may be configured to control access to network 104 and its resources. In one embodiment, access server 102 may be incorporated into a network switching device. Access server 102 may receive requests from one or more clients 106 to access resources stored by network 104. For example, a client 106 may connect to access server 102 via a port of access server 102 and request access to one or more resources stored by network 104. Client 106 may connect to access server 102 via wired or wireless communication links. Access server 102 is configured to authenticate the requesting client and allow the client to access network 104 only upon successful authentication of the client.

In one embodiment, access server 102 may comprise an access control module 108 that is configured to facilitate processing related to access control and authentication of clients. Access control module 108 may be implemented in hardware, software (e.g., code, instructions) executed by a processor of access server 102, or combinations thereof.

The authentication process may be performed by access server 102 in collaboration with other servers or systems. For example, as depicted in FIG. 1, authentication may be performed by access server 102 in collaboration with an authentication server 110. In one embodiment, upon receiving a request from a client to access a network resource, access control module 108 of access server 102 may be configured to use services provided by authentication server 110 to authenticate the client. In this manner, authentication server 110 provides a central authority for authenticating clients. Authentication server 110 may use various different authentication protocols including 802.1x authentication, media access control (MAC) based authentication, and others. An example of authentication server 110 is a Remote Authentication Dial-In User Service (RADIUS) server.

Authentication server 110 may receive one or more authentication requests from one or more access servers 102. Upon receiving an authentication request, authentication server 110 may use information contained in the request and information available or stored by the authentication server to perform the authentication. Authentication server 110 may also request additional information that is then used for the authentication. Results of the authentication may be communicated from authentication server 110 to the access server that is the source of the authentication request.

Access server 102 may then either grant or deny access to the client based upon authentication results received from authentication server 110. In one embodiment, upon successful authentication of a client, the client (or user using the client) is allowed to access network resources via the port through which the client connects to the access server 102. The port may be configured to allow packets received from the authenticated client to enter the network. If authentication is not successful, then access to network 104 is denied to the requesting client. Packets sent by the client are prevented from entering the network. In some embodiments, the rejected client may be granted limited access and may not be completely cut from the network if the authentication is not successful.

Access server 102, authentication server 110, and clients 106 may be any computing device. These computing devices may comprise a processor that is configured to execute code or instructions that may be stored on a memory storage medium. Examples of clients include a personal computer, a personal data assistant, a printer, an IP phone, and the like. A client 106 may comprise hardware and/or software modules that enable it to connect to access server 102.

Clients 106 may have different capabilities. For example, one client may support a particular authentication technique while another client may not. A client is deemed to support an authentication technique if the client can interpret one or more requests or messages received by the client as part of the authentication technique processing and can respond to the requests or messages in an appropriate manner. Accordingly, the authentication technique used to authenticate a client may depend upon the capabilities of the client being authenticated. For example, in one embodiment, authentication may be performed using an 802.1x authentication technique or an authentication technique based upon the MAC address of the client (referred to as MAC-based authentication). A client may be able to support 802.1x authentication only if the client has an 802.1x client authentication module that can interpret and respond to 802.1x authentication requests. A set of clients may however not have an 802.1x client authentication module and thus not be able to support 802.1x authentication. For example, in the embodiment depicted in FIG. 1, the client depicted on the left comprises a client authentication module 112 that may be a 801.1x client module while the other client (on the right) does not. In this scenario, the client on the left supports 802.1x authentication while the client on the right may not. In such a scenario, the client on the left may be authenticated using 802.1x authentication while the client on the right will have to be authenticated using an alternative technique such as MAC-based authentication.

The use of 802.1x authentication and MAC-based authentication may be used as an example to illustrate an embodiment of the present invention. Consider an environment where authentication may be performed using 802.1x authentication or MAC-based authentication with the 802.1x authentication having a higher precedence (i.e., 802.1x authentication is preferred to MAC-based authentication). In such an embodiment, upon receiving an access request from a client, access server 102 is configured to initiate both 802.1x authentication and MAC-based authentication processing in parallel. If it is determined during the 802.1x authentication processing that the requesting client is able to support 802.1x authentication, then the 802.1x authentication is preferred to the MAC-based authentication and accordingly the MAC-based authentication is aborted. In this scenario, 802.1x authentication is used to authenticate the client and to determine whether the client is denied or allowed access to the network resources. If however, it is determined during 802.1x authentication processing that the requesting client is unable to support 802.1x authentication, then results from the MAC-based authentication are used to determine whether or not to allow the client access to network resources. By initiating both the authentication processes in parallel, time required for the overall client authentication is reduced. In this manner, clients of differing capabilities may be appropriately authenticated in an efficient manner. Further details related to the authentication processing are described below with reference to flowchart 200 depicted in FIG. 2.

Figure 2A:
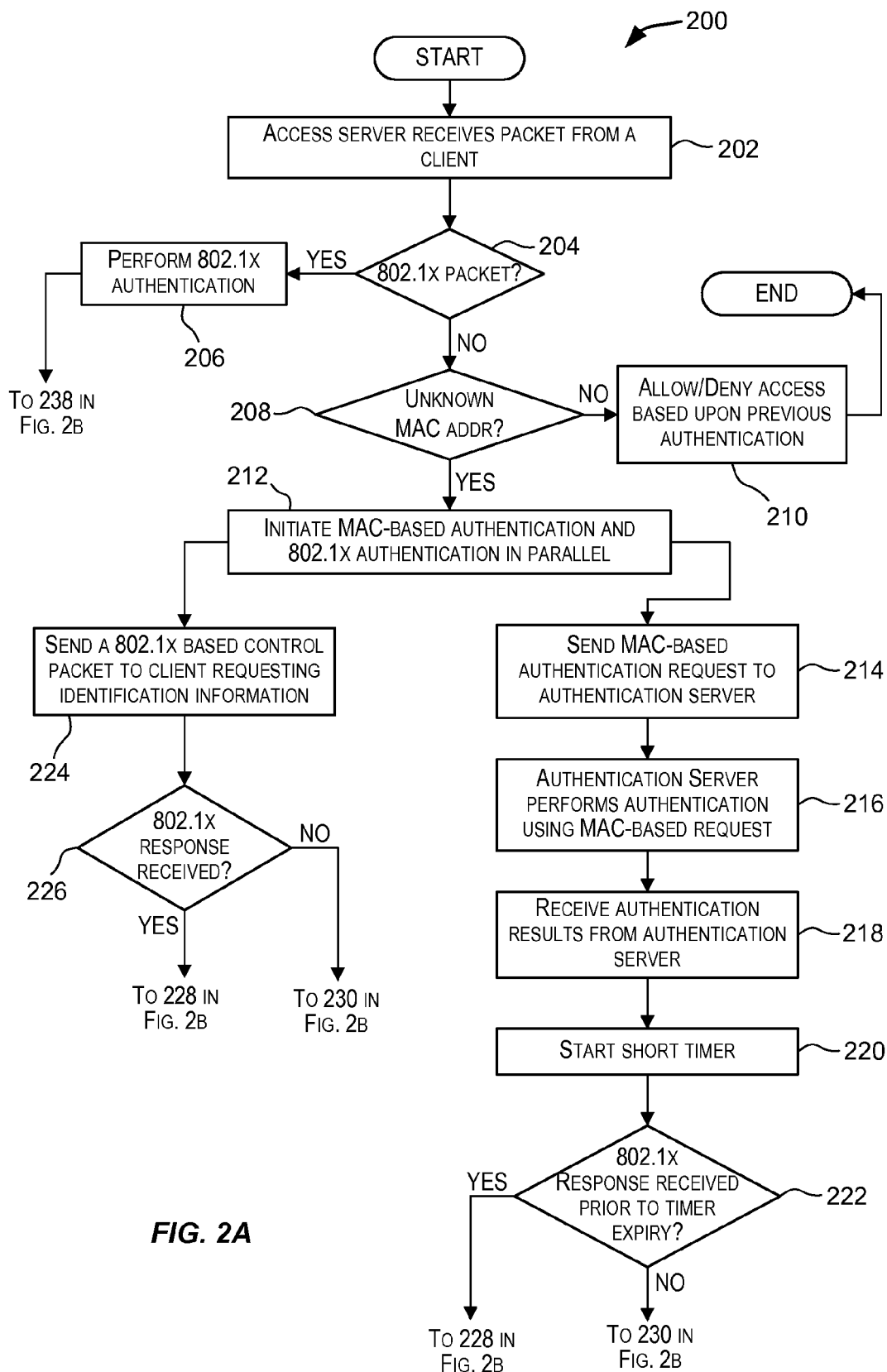
FIGS. 2A and 2B depict a simplified flowchart showing a method for performing authentication according to an embodiment of the present invention.
Figure 2B:
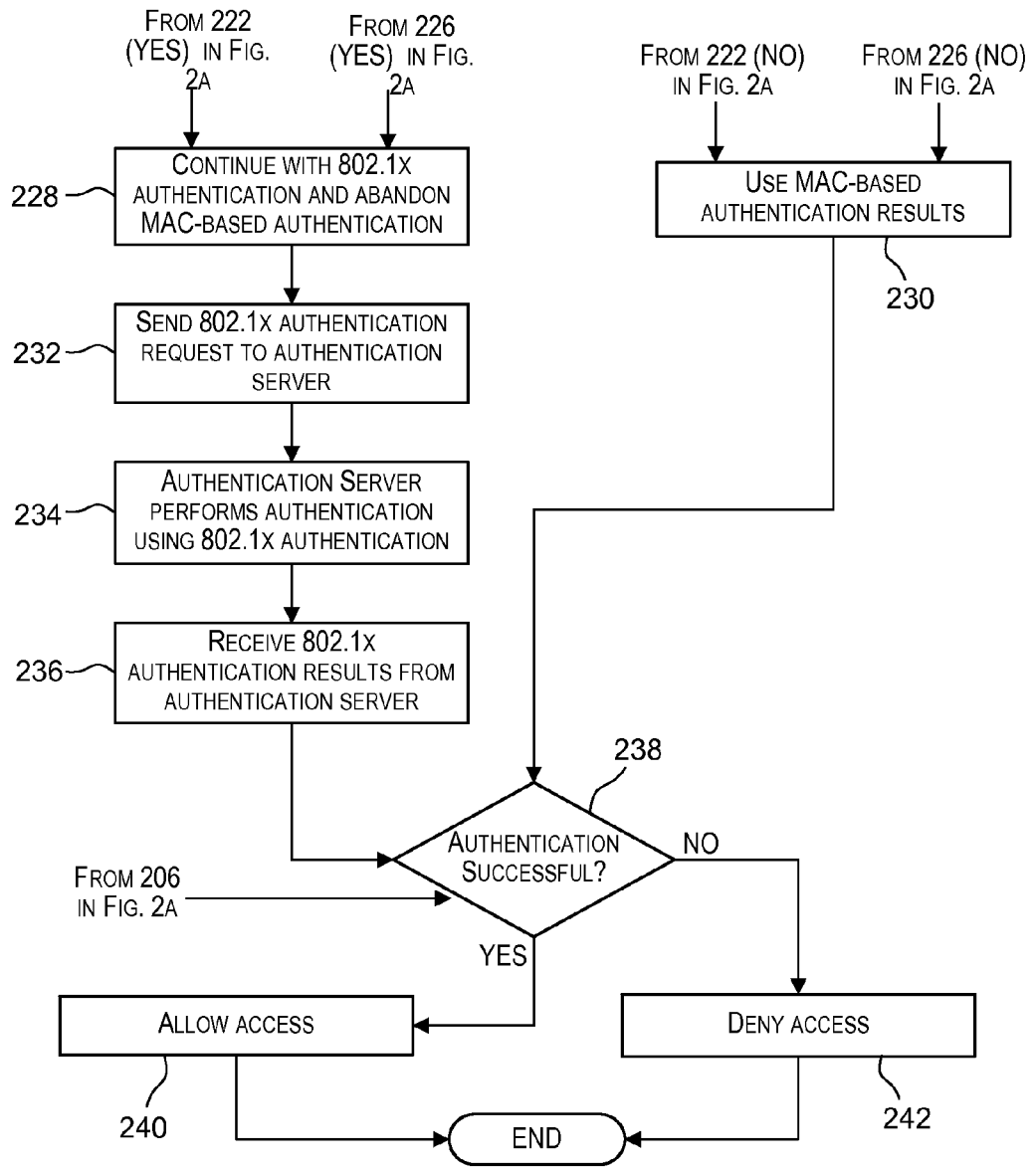

FIGS. 2A and 2B depict a simplified flowchart 200 showing a method for performing authentication according to an embodiment of the present invention. The processing depicted in flowchart 200 may be performed by hardware modules, software modules (e.g., code or instructions that may be stored on a computer-readable storage medium) executed by a processor, or combinations thereof. The embodiment depicted in FIGS. 2A and 2B and described below assumes that authentication may be performed using 802.1x authentication or MAC-based authentication with the 802.1x authentication having a higher precedence (higher preference) than the MAC-based authentication. Other authentication techniques may be used in alternative embodiments.

As depicted in FIG. 2A, processing may be initiated when access server 102 receives a packet from a client 106 (step 202). Client 106 may connect to access server 102 via a port of access server 102 and send one or more packets to access server 102 requesting access to network 104. Access control module 108 of access server 102 may be configured to perform further processing of the packet and facilitate authentication of the client.

A determination is then made if the packet received from the requesting client is an 802.1x packet (step 204). Various techniques may be used to determine if the received packet is an 802.1x packet. According to one technique, any packet having a MAC address of 01:80:C2:00:00:03, which is a global well known 802.1x MAC address, is identified as an 802.1x packet. Accordingly, in one embodiment, access control module 108 of access server 102 may be configured to analyze the packet received from the client to determine if the packet has an associated MAC address of 01:80:C2:00:00:03 thereby indicating that it is an 802.1x packet. Other information related to a packet may also be used to determine whether it is an 802.1x packet using other techniques.

If is it determined in 204 that the packet received in 202 is an 802.1x packet, then 802.1x authentication is performed (step 206). Processing then continues with step 234 where authentication results are used to determine whether to allow or deny access to the client sending the packet.

If it is determined in 204 that the packet received from the client is not an 802.1x packet, then a check is made if the MAC address of the packet is unknown (step 208). The MAC address of the packet represents the MAC address of the client device that sent the packet. A MAC address is unknown if the MAC address has not been previously authenticated. In one embodiment, access server 102 may store records for previously authenticated devices or MAC addresses with each entry indicating whether the MAC address corresponding to the entry was successfully authenticated (the authentication may have been performed using MAC-based authentication or 802.1x authentication). If the MAC address of the packet matches a MAC address in a stored record, then the MAC address is considered as "known". The records information may be stored by access server 102. If it is determined in 208 that the MAC address of the packet is known, then the packet may be allowed or denied entry to the network based upon the previously performed authentication results (step 210). If known, the matching stored entry for the MAC address may indicate whether the authentication for the MAC address was successful, in which case the packet is allowed to enter network 104.

If it is determined in 208 that the MAC address is unknown, then access server 102 initiates both MAC-based authentication and 802.1x authentication such that both authentication processes are performed concurrently or in parallel (step 212).

MAC-based authentication constitutes sending an authentication request based upon the MAC address of the packet to authentication server 110 (step 214). In one embodiment, the authentication request is in the form of a packet comprising a username and a password. In MAC-based authentication, the MAC address of the packet is used as the username and the password, with the password possibly being encrypted. Accordingly, access server 102 may generate an authentication request packet with the username and password set to the MAC address of the packet received in 202 and sends the packet to authentication server 110.

Authentication server 110 then performs authentication using the MAC-based authentication request (step 216). Authentication server 110 uses the username and the password in the packet to perform the authentication. Since both of these are set to the MAC address of the packet received in 202, in effect the MAC address is used for the authentication.

In one embodiment, authentication server 110 is a generic server that stores entries for various users to be authenticated. Properties may also be stored for the users. As part of authentication, authentication server 110 searches the stored entries to find an entry whose username and password matches the username and password received from the access server 102. In the case of MAC-based authentication, the username and password are both set to the MAC address. Accordingly, authentication server 110 searches for an entry whose username and password matches the MAC address. Information in the matching entry may then be used for authentication. The entry may also identify a particular authentication method (e.g., MD5) to be used.

After authentication has been performed, authentication server 110 sends a response back to the access server 102 indicating whether the MAC address authentication failed or succeeded. If MAC-based authentication is successful, authentication server 110 may also send back properties for the MAC address that define the scope of access to be permitted for a client with the MAC address. These properties may specify, for example, if the user (which in this case is the client with the particular MAC address) is to be restricted to a particular mode or virtual LAN (VLAN), access control lists (ACLs) to be installed for the user, etc. Accordingly, access server 102 receives MAC-based authentication results from authentication server 110 (step 218).

It should be noted that while MAC-based authentication is being performed, the 802.1x authentication is also being performed in parallel. Further, it may be possible that getting a response in the 802.1x authentication may take a longer time than MAC-based authentication. Accordingly, a short timer is started (step 220) to provide enough time for an 802.1x response, if any, to be received from the client as part of the 802.1x authentication. In one embodiment, the duration of the timer is 3 seconds. The timer provides sufficient time for a client that can support 802.1x authentication to indicate to access server 102 that it can support 802.1x authentication (e.g., by sending a response to an 802.1x authentication request, see steps 224 and 226). A client is deemed to support an authentication technique if the client can interpret one or more requests or messages received by the client as part of the authentication technique processing and can respond to the requests or messages in an appropriate manner. A check is made to see if an 802.1x response is received prior to the timer expiring (step 222).

As indicated above, the 802.1x authentication is performed in parallel to the MAC-based authentication. As part of 802.1x authentication, access server 102 sends a packet to the client requesting identification information (step 224). In one embodiment, an Extensible Authentication Protocol (EAP) Request ID is sent in 224 from access server 102 to the client.

If the client comprises an 802.1x client authentication module, then this module is able to interpret and respond to the identification information request received from access server 102. If the client does not support 802.1x authentication, then the client will not be able to respond to the identification information request received from access server 102. Accordingly, a check is made to see if access server 102 receives a response from the client (step 226). Receipt of the response indicates to access server 102 that the client is able to support 802.1x authentication. Accordingly, if it is determined in 226 that a response has been received, then a decision is made to continue with 802.1x authentication and MAC-based authentication is abandoned (since 802.1x authentication is preferred over MAC-based authentication) (step 228).

If it is determined in 226 that a response is not received from the client in response to the EAP identification request sent to the client, it is assumed that the client is not able to support 802.1x authentication and thus not able to respond. In this case, a decision is made to use the MAC-based authentication results (step 230).

As previously described, on the MAC-based authentication side, which proceeds in parallel with the 802.1x authentication, a timer is started (step 220) to provide time for receiving an 802.1x response from the client. If an 802.1x response is received prior to the timer expiry, then it indicates that the client can support 802.1x authentication, and processing proceeds with step 228 wherein a decision is made to continue with 802.1x authentication and MAC-based authentication is abandoned. Any MAC-based authentication results received from the authentication server 110 may be discarded. If however, an 802.1x response is not received prior to the timer expiry, then it is assumed that the client is not able to support 802.1x authentication and thus not able to respond and a decision is made to use the MAC-based authentication results per step 230.

Accordingly, the 802.1x authentication and MAC-based authentication techniques are performed in parallel. If an indication is received from the client that the client can support 802.1x authentication (which is the preferred authentication technique), then the MAC-based authentication is aborted and authentication is performed using 802.1x authentication. If, on the other hand, no indication is received from the client that it can support 802.1x authentication then authentication is performed using MAC-based authentication.

If a response is received from the client responsive to the identification information request, the response may comprise information such as a username, password, and other information related to the client or user of the client. After deciding to continue with 802.1x authentication in 228, access server 102 sends an 802.1x authentication request to authentication server 110 (step 232). The authentication request may be in the form of an EAP packet comprising the identification information received from the client.

Authentication server 110 is configured to extract the identification information from the authentication request and use it to perform authentication (step 234). As part of 234, authentication server 110 may search a database of entries to find a matching entry having a username and password that matches the username and password received from the access server 102. The matching entry may then be used for authentication. The matching entry may also identify a specific authentication scheme (e.g., MD5) to be used.

After performing authentication, authentication server 110 sends a response back to access server 102 indicating whether the authentication failed or succeeded. If 802.1x authentication is successful, authentication server 110 may also send back properties that define the scope of access to be permitted for the client. These properties may specify, for example, if the user is to be restricted to a particular mode or VLAN, access control lists (ACLs) to be installed for the user, etc. Accordingly, access server 102 receives 802.1x authentication results from authentication server 110 (step 236).

A check is then made to see if the authentication was successful (step 238). If a decision has been previously made in 228 to use 802.1x authentication, then results received from authentication server 110 from the 802.1x authentication are used to determine if the authentication was successful. If, on the other hand, a decision has been previously made in 230 to use MAC-based authentication results, then results received from authentication server 110 from the MAC-based authentication are used to determine if the authentication was successful.

If authentication is determined to be successful then the client is allowed to access resources from network 104 and send packets to network 104 (step 240). The client may be marked as allowed access. If authentication has failed, then the client is not permitted to use network resources of network 104 or send packets to network 104 (step 242). The client may be marked as denied access and future packets received from the client over the port are dropped by access server 102. In some embodiments, the rejected client may be granted limited access and may not be completely cut from the network.

As described above, authentication is performed using either 802.1x authentication or the MAC-based authentication, wherein the 802.1x authentication is preferred over the MAC-based authentication. Both the authentication techniques are initiated and performed in parallel. The MAC-based authentication technique is used only when the client cannot support the 802.1x authentication. Accordingly, if an indication is received that the client can support 802.1x authentication, then the MAC-based authentication is aborted. If it is determined that the client cannot support 802.1x authentication (possibly because the client does not run an embedded 802.1x client authentication module), then MAC-based authentication is used. In this manner, clients of differing capabilities (i.e., those that can support 802.1x authentication and those that cannot) may be authenticated. Further, by initiating both authentication techniques concurrently, the authentication is performed in timely and efficient manner.

The teachings of the present invention are however not restricted to 802.1x and MAC-based authentication techniques but are applicable to other types of authentication techniques. The teachings described above are applicable to any network environment where multiple authentication techniques are available for authenticating a client, and where one of the available authentication techniques, when available, is preferred to the other authentication techniques. In such a scenario, upon receiving a packet from a client, the multiple authentication techniques are initiated such that the techniques are performed in parallel. If it is determined that the client supports the preferred authentication technique, then all other authentication techniques are aborted and the preferred technique is used to authenticate the client. A client is deemed to support the preferred authentication technique if the client can interpret one or more requests or messages received by the client as part of the preferred authentication technique processing and can respond to the requests or messages in an appropriate manner. If it is determined that the preferred authentication technique is not supported by the client, then some other authentication technique may be used to authenticate the client.

In the embodiments described above, the MAC address of the client was used for performing authentication. In alternative embodiments, other addresses associated with the client such as the Internet Protocol (IP) address of the client, etc., may also be used for performing authentication.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A non-transitory computer-readable medium storing a plurality of instructions executable by a processor for performing authentication, the plurality of instructions comprising:

instructions that cause the processor to initiate a first authentication technique and a second authentication technique for authenticating a client such that the first authentication technique and the second authentication technique are performed concurrently;

instructions that cause the processor to determine if the client supports the first authentication technique;

instructions that cause the processor to use the first authentication technique to authenticate the client upon determining that the client supports the first authentication technique; and instructions that cause the processor to use the second authentication technique to authenticate the client upon determining that the client does not support the first authentication technique.

2. The non-transitory computer-readable medium of claim 1 wherein the plurality of instructions further comprises:

instructions that cause the processor to deny or permit the client to access a network based upon the first authentication technique if the client supports the first authentication technique and based upon the second authentication technique if the client does not support the first authentication technique.

3. The non-transitory computer-readable medium of claim 1 wherein the second authentication technique uses an address associated with the client.

4. The non-transitory computer-readable medium of claim 3 wherein the address associated with the client is a medium access control (MAC) address of the client or an Internet Protocol (IP) address of the client.

5. The non-transitory computer-readable medium of claim 1 wherein the first authentication technique is based upon IEEE 802.1x.

6. The non-transitory computer-readable medium of claim 1 wherein the instructions that cause the processor to initiate the first authentication technique and the second authentication technique comprise:

instructions that cause the processor to send, as part of the first authentication technique, an information request to the client; and instructions that cause the processor to send, as part of the second authentication technique, a first authentication request comprising an address of the client to an authentication server.

7. The non-transitory computer-readable medium of claim 6 wherein the instructions that cause the processor to determine if the client supports the first authentication technique comprise instructions that cause the processor to determine that the client does not support the first authentication technique if a response is not received from the client responsive to the information request.

8. The non-transitory computer-readable medium of claim 6 wherein the plurality of instructions further comprises instructions that cause the processor to receive a response from the client responsive to the information request, and wherein the instructions that cause the processor to use the first authentication technique to authenticate the client comprise:

instructions that cause the processor to send a second authentication request to the authentication server, the second authentication request comprising information received in the response; and instructions that cause the processor to receive an authentication result from the authentication server indicative of authentication performed by the authentication server based upon the second authentication request.

9. The non-transitory computer-readable medium of claim 8 wherein the instructions that cause the processor to use the first authentication technique to authenticate the client comprise instructions that cause the processor to abort the second authentication technique.

10. The non-transitory computer-readable medium of claim 6 wherein the instructions that cause the processor to use the second authentication technique to authenticate the client comprise instructions that cause the processor to receive an authentication result from the authentication server indicative of authentication performed by the authentication server based upon the first authentication request.

11. The non-transitory computer-readable medium of claim 1 wherein the plurality of instructions further comprises:
    instructions that cause the processor to determine whether an address associated with a packet received from the client has been previously authenticated; and
    instructions that cause the processor to initiate the first authentication technique and the second authentication technique only upon determining that the address has not been previously authenticated.

12. A device comprising:
    a port; and
    a processor;
    wherein the processor is adapted to:
        initiate a first authentication technique and a second authentication technique for authenticating a client such that the first authentication technique and the second authentication technique are performed concurrently;
        determine if the client supports the first authentication technique;
        use the first authentication technique to authenticate the client upon determining that the client supports the first authentication technique; and
        use the second authentication technique to authenticate the client upon determining that the client does not support the first authentication technique.

13. The device of claim 12 wherein the processor is adapted to deny or permit the client to access a network based upon the first authentication technique if the client supports the first authentication technique and based upon the second authentication technique is the client does not support the first authentication technique.

14. The device of claim 12 wherein the second authentication technique uses an address associated with the client.

15. The device of claim 14 wherein the address associated with the client is a medium access control (MAC) address of the client or an Internet Protocol (IP) address of the client.

16. The device of claim 12 wherein the first authentication technique is based upon IEEE 802.1x.

17. The device of claim 12 wherein the processor is adapted to:
    send, as part of the first authentication technique, an information request to the client; and
    send, as part of the second authentication technique, a first authentication request comprising an address of the client to an authentication server.

18. The device of claim 17 wherein the processor is adapted to determine that the client does not support the first authentication technique if a response is not received from the client responsive to the information request.

19. The device of claim 17 wherein the processor is adapted to:
    receive a response from the client responsive to the information request;
    send a second authentication request to the authentication server, the second authentication request comprising information received in the response; and
    receive an authentication result from the authentication server indicative of authentication performed by the authentication server based upon the second authentication request.

20. The device of claim 19 wherein the processor is adapted to abort the second authentication technique.

21. The device of claim 17 wherein the processor is adapted to receive an authentication result from the authentication server indicative of authentication performed by the authentication server based upon the first authentication request.

22. The device of claim 12 wherein the processor is configured to:
    determine whether an address associated with a packet received from the client has been previously authenticated; and
    initiate the first authentication technique and the second authentication technique only upon determining that the address has not been previously authenticated.

* * * * *